United States Patent [19]
Hughes

[11] Patent Number: 5,276,329
[45] Date of Patent: Jan. 4, 1994

[54] IMAGE DETECTOR

[75] Inventor: John R. Hughes, Morley, England

[73] Assignee: U.S. Philips Corporation, New York, N.Y.

[21] Appl. No.: 907,421

[22] Filed: Jul. 1, 1992

[30] Foreign Application Priority Data

Jul. 15, 1991 [GB] United Kingdom ............... 9115259

[51] Int. Cl.⁵ ........................... G01T 1/20; G01T 1/24
[52] U.S. Cl. ........................... 250/370.11; 250/370.09
[58] Field of Search ............... 250/370.09, 370.11, 250/366, 368, 369, 327.2; 257/98; 378/62, 99

[56] References Cited

U.S. PATENT DOCUMENTS

| | | | |
|---|---|---|---|
| 4,288,264 | 9/1981 | Haque | 250/370.09 X |
| 4,736,397 | 4/1988 | Velasquez | 378/99 |
| 5,138,147 | 8/1992 | van Aller et al. | 378/99 X |

FOREIGN PATENT DOCUMENTS

| | | | |
|---|---|---|---|
| 2468999 | 5/1981 | France | 250/370.11 |
| 58-189574 | 11/1983 | Japan . | |
| 59-122988 | 7/1984 | Japan | 250/370.11 |
| 3-94188 | 4/1991 | Japan | 250/370.11 |
| 3333738 | 5/1985 | Netherlands . | |

Primary Examiner—Constantine Hannaher
Assistant Examiner—Edward J. Glick
Attorney, Agent, or Firm—Paul R. Miller

[57] ABSTRACT

An image detector (1) has a first substrate (10) carrying an electromagnetic radiation conversion layer (11) for converting incoming electromagnetic radiation (A) with a first range of wavelengths into outgoing electromagnetic radiation (B) with a second different range of wavelengths and a photodetector array (21) is carried by a second substrate (20) and responsive to the second range of wavelengths for detecting outgoing electromagnetic radiation (B) emitted by the layer (11). The second substrate (20) is mounted to the first substrate (10) by a mounting arrangement (40) defining an insulative space (50) which provides good electrical isolation between the photodetector array (21) and the electromagnetic radiation conversion layer (11). The use of separate substrates (10 and 20) enables the photodetector array (21) and electromagnetic radiation conversion layer (11) to be manufactured independently of one another using optimum processes for producing the desired properties for the photodetector array (21) and electromagnetic radiation conversion layer (11), respectively.

15 Claims, 2 Drawing Sheets

IMAGE DETECTOR

DESCRIPTION

This invention relates to an image detector comprising a first substrate carrying an electromagnetic radiation conversion layer for converting incoming electromagnetic radiation with a first range of wavelengths into outgoing electromagnetic radiation with a second different range of wavelengths and a photodetector array responsive to the second range of wavelengths for detecting outgoing electromagnetic radiation emitted by the electromagnetic radiation conversion layer.

BACKGROUND OF THE INVENTION

European Patent Application No. EP-A-0125691 describes such an image detector in which the photodetector array is provided as a matrix of photosensitive diodes or photodiodes and associated thin-film circuitry on one major surface of an insulative substrate and the electromagnetic radiation conversion layer is provided as a layer of phosphor material dispersed in a binder on the other surface of the insulative substrate. Such an arrangement requires that the insulative substrate be transparent to the outgoing radiation emitted by the electromagnetic radiation conversion layer. Moreover, it requires that the processing technology used to provide the phosphor layer be compatible with that used to form the photodetector array and, for example, the processing temperatures which can be withstood by amorphous silicon thin film circuits lie at the lowermost end of the deposition temperature range for phosphors such as caesium iodide.

SUMMARY OF THE INVENTION

According to one aspect of the present invention there is provided an image detector comprising a first substrate carrying an electromagnetic radiation conversion layer for converting incoming electromagnetic radiation with a first range of wavelengths into outgoing electromagnetic radiation with a second different range of wavelengths and a photodetector array responsive to the second range of wavelengths for detecting outgoing electromagnetic radiation emitted by the electromagnetic radiation conversion layer, characterised in that the photodetector array is carried by a second substrate and in that the second substrate is mounted to the first substrate by mounting means forming a seal between edges of the first and second substrates which substrates are spaced apart to define an insulative space between the photodetector array and the electromagnetic radiation conversion layer on the respective substrates.

In another aspect, the present invention provides a method of manufacturing an image detector, which method comprises providing an electromagnetic radiation conversion layer on a first substrate for converting incoming electromagnetic radiation with a first range of wavelengths into outgoing electromagnetic radiation with a second different range of wavelengths and providing a photodetector array responsive to the second range of wavelengths for detecting outgoing electromagnetic radiation emitted by the electromagnetic radiation conversion layer, characterised by providing the photodetector array on a second substrate and mounting the second substrate to the first substrate by forming a seal between edges of the first and second substrates which substrates are spaced apart to define an insulative space between the photodetector array and the electromagnetic radiation conversion layer.

The present invention thus provides an image detector in which the photodetector array and electromagnetic radiation conversion layer are carried by separate substrates which are mounted to one another so as to define an insulative space between the photodetector array and the electromagnetic radiation conversion layer thereby providing good electrical isolation between the photodetector array and the electromagnetic radiation conversion layer. The use of separate substrates enables the photodetector array and electromagnetic radiation conversion layer to be manufactured independently of one another and thus allows the processes used for this manufacture to be optimised for the desired properties of the photodetector array and for the desired properties of the electromagnetic radiation conversion layer, respectively.

Preferably the seal of the mounting means defines a fluid-tight space and the fluid-tight space is evacuated to provide the insulative space with extremely good electrical isolation, that is very high resistance and very low capacitance, and which is inherently transparent to the electromagnetic radiation emitted by the photodetector array. As one possible alternative, the fluid-tight space may be filled with an inert fluid, for example an inert gas such as argon or nitrogen. The fluid-tight space may alternatively be filled with an inert liquid which may be selected so as to have a refractive index which is matched, closely matched, to that of the electromagnetic radiation conversion layer so as to, for example, reduce loss of electromagnetic radiation by scattering.

The mounting means may comprise discrete insulative spacer members within the insulative space and an adhesive medium sealing the boundary of the insulative space. The discrete insulative spacer members may be, for example, glass fibres, spheres or particles while the adhesive medium may be provided by, for example, printing a glue line onto the periphery of one of the two surfaces to be joined together. This provides a simple yet effective way of ensuring that the photodetector array and electromagnetic radiation conversion layer are spaced-apart by a small well-defined distance determined by the discrete insulative spacer members and allows a relative simple technology such as the printing of a glue line to be used to seal the boundary of the insulative space. The adhesive medium could also be provided as a layer, for example a layer of a silicone rubber, within which spacer members may be dispersed and which is applied to cover one of the two surfaces to be joined together.

The electromagnetic radiation conversion layer and the photodetector array may form opposed surfaces bounding the insulative space so that the photodetector array and electromagnetic radiation conversion layer are sealed within the insulative space and thus protected from any contamination in the environment in which the detector is situated. In addition, in such a case, the substrate of the electromagnetic radiation conversion layer may also serve as a light reflecting layer to prevent electromagnetic radiation outside the range which it is desired to detect from reaching the electromagnetic radiation conversion layer.

The electromagnetic radiation conversion layer may comprise an X-ray phosphor while the photodetector array may comprise an array of photodiodes with associated thin-film circuitry.

BRIEF DESCRIPTION OF THE DRAWING FIGURES

Embodiments of the invention will now be described, by way of example, with reference to the accompanying drawings, in which.

It should of course be understand that the Figures are merely schematic and are not to scale. Like reference numerals have been used to refer to like parts throughout the drawings.

DESCRIPTION OF THE INVENTION

Figure 1:
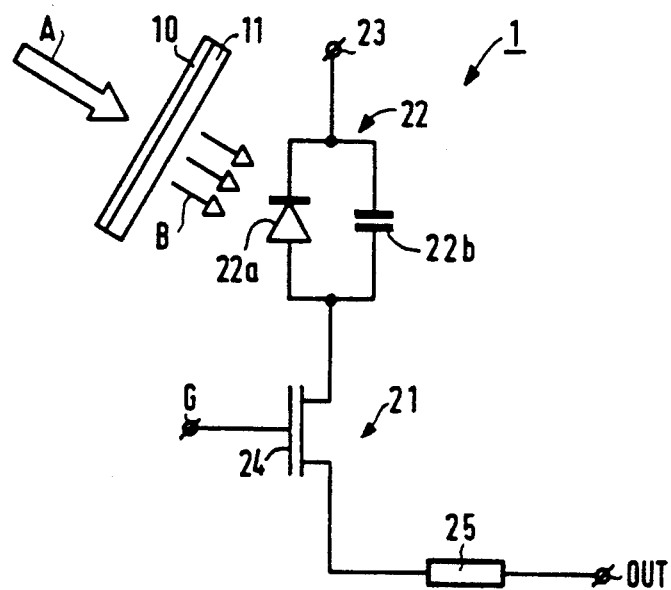
FIG. 1 illustrates by way of a simplified schematic circuit the principle of operation of an image detector in accordance with the invention.

Referring now to the drawings, there is illustrated in FIGS. 1-4 an image detector 1 comprising a first substrate 10 carrying an electromagnetic radiation conversion layer 11 for converting incoming electromagnetic radiation A with a first range of wavelengths into outgoing electromagnetic radiation B with a second different range of wavelengths and a photodetector array 21 responsive to the second range of wavelengths for detecting outgoing electromagnetic radiation B emitted by the electromagnetic radiation conversion layer 11. In accordance with the invention, the photodetector array 21 is carried by a second substrate 20 and the second substrate 20 is mounted to the first substrate 10 by mounting means 40 defining an insulative space 50 between the photodetector array 21 and the electromagnetic radiation conversion layer 11.

The present invention thus provides an image detector 1 in which the photodetector array 21 and electromagnetic radiation conversion layer 11 are carried by different substrates 10, 20, thereby enabling the photodetector array 21 and electromagnetic radiation conversion layer 11 to be manufactured independently of one another using the optimum processes for producing the desired properties for the photodetector array 21 and electromagnetic radiation conversion layer 11, respectively, without having to take into account the interaction of the effects of these processes. The insulative space 50 provides good electrical isolation between the photodetector array 21 and the electromagnetic radiation conversion layer 11 and enables detrimental effects on the optical transmission of the outgoing electromagnetic radiation B to be avoided or at least reduced.

The principles of the structure and operation of one embodiment of an image detector 1 in accordance with the invention will now be described with reference to FIGS. 1 to 3.

Figure 2:
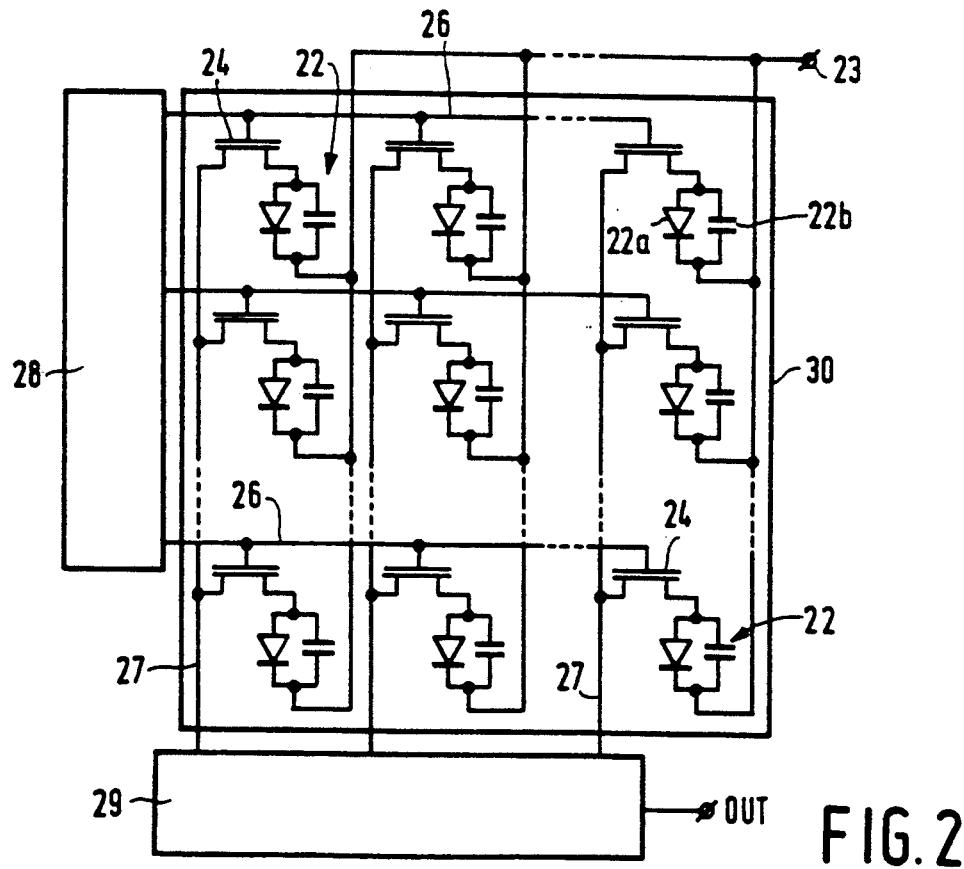
FIG. 2 is a schematic circuit layout of the photodetector array of an image detector in accordance with the invention.
Figure 3:
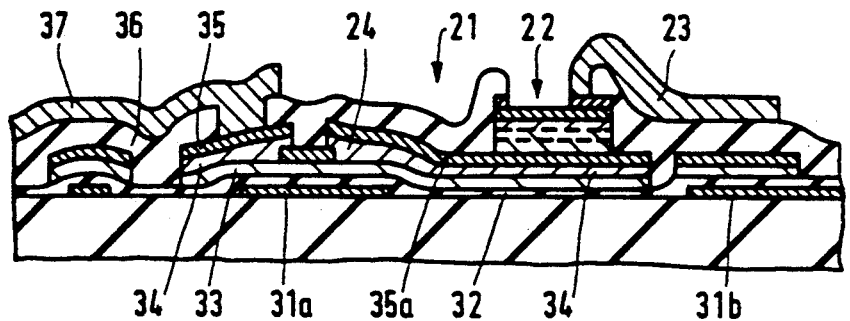
FIG. 3 is a schematic cross-sectional view through part of a photodetector array of an image detector in accordance with the invention.
Figure 4:
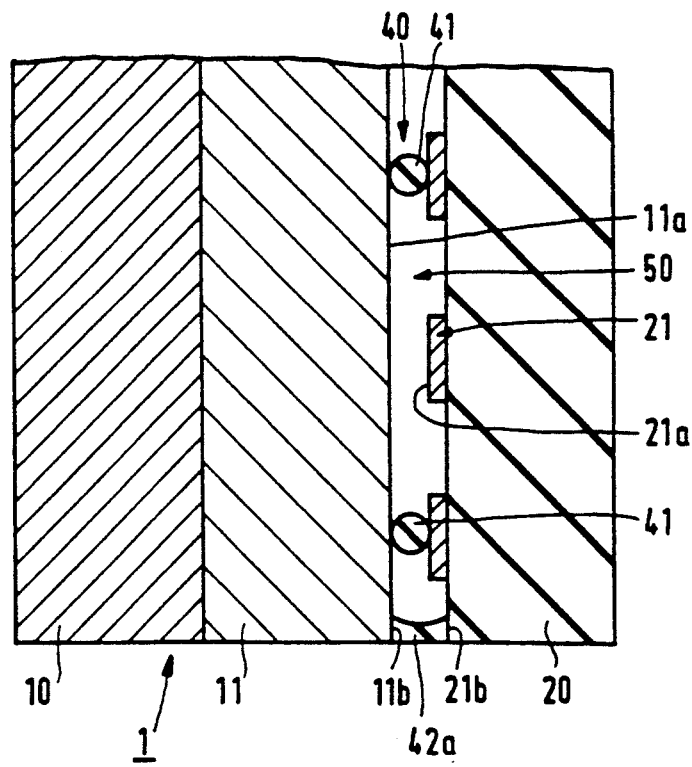
FIG. 4 is a cross-sectional view through part of an image detector in accordance with the invention illustrating the mounting to one another of the photodetector array and the electromagnetic radiation conversion layer.

In the example illustrated by FIGS. 1 to 3 the incoming radiation A to be detected comprises X rays with, typically, energies in the range of 40-120 KeV (Kilo electron volts). The incoming X-rays A are converted by, in this example, an electromagnetic radiation conversion layer 11 in the form of a phosphor layer to visible electromagnetic radiation B which is then detected by the photodiode array 21. In this particular example, the phosphor layer 11 comprises a thallium-doped caesium iodide (CsI) layer deposited onto a conventional substrate 10, generally an aluminium substrate. Although not shown in FIG. 1 the CsI layer 11 may be covered by a protective layer, for example a polyimide layer.

The outgoing electromagnetic radiation B emitted by the phosphor layer 11 is incident on the photodetector array 21 which, in this example, comprises a two dimensional array of photodiodes 22 with a pitch of typically 200 μm (micrometers) or less and an overall size of up to 400 by 400 mm to achieve the sort of resolution required where the image detector is to be used for detecting diagnostic X-ray images of areas of a human or animal body. As will be described in slightly greater detail below, in this example the photodiodes 22 are formed as amorphous silicon (a-Si) diodes deposited on an insulative, generally glass, substrate, together with thin film circuitry for controlling the storage of and reading of charge on the photodiodes 22.

FIG. 1 illustrates schematically the circuit of the photodetector array for one photodiode 22 which is represented as a diode 22a in parallel with a capacitor 22b which, in this example, comprises merely the parasitic capacitance of the diode but may include an additional capacitor to improve the dynamic range of the detector. The cathode of the diode 22a is connected to a common electrode 23 while the anode is connected to a controllable semiconductor switching element 24 which enables the charge stored on the capacitor 22b to be read out. In this example the switching element 24 is a thin-film transistor with its main current path connected between the anode of the diode 22a and a charge-sensitive read out amplifier 25 of a conventional type. Alternative switching elements, such as thin-film diodes, could however be used.

FIG. 2 illustrates schematically the circuit layout of an area of the photodetector array 21. As mentioned above a two dimensional array of photodiodes 22 is provided. Typically, the array may be a 2000×2000 array. For convenience only a portion of the array is shown in full in FIG. 2.

The thin-film transistor switching elements 24 are arranged in a matrix of 1-m row 26 and 1-n columns 27 (only three rows and three columns are shown) with the gate G (see FIG. 1) of each transistor in a given row being connected to the same row line 26 of a row driver or decoder/addressing circuit 28 and the source of each transistor in a given column being connected to the same column line 27 of a column decoder/addressing circuit 29 including read out amplifiers as shown in FIG. 1. The solid line 30 indicates the extent of the electromagnetic radiation detecting area of the photodetector array 21.

The photodetector array 21 may be manufactured using conventional thin-film technology on an insulative substrate, generally a glass substrate. For example, the photodetector array 21 may be manufactured using amorphous silicon technology in a manner similar to that used for liquid crystal display devices and in a manner similar to that described, albeit for a linear sensor, in a paper entitled a-Si:H TFT driven linear image sensor by H. Ito et al published in Materials Research Society Symposium Proceedings Volume 95 at pages 437 to 444.

FIG. 3 illustrates, by way of an explanatory example only, a cross-section part of a thin-film structure which may be used to form the photodiode array 21. FIG. 3 shows, in cross-section one thin-film transistor 24 (as shown an inverted staggered transistor) with an associated photodiode 22 and various interconnections.

A first metal, generally chrome layer 31, provided on the substrate 20 is patterned to define the gate metal 31a and gate interconnections 31b. A subsequent insulating layer, generally silicon nitride or silicon oxide, 32 defines the gate insulator and is followed by an intrinsic amorphous silicon layer 33 providing the transistor channel region, a doped amorphous silicon layer 34 may then be provided to form highly doped contact regions of the source and drain regions of the transistor. A further metallisation level 35 is then provided to enable contact to the source and drain of the transistor 24. The photodiode 22 is provided on the drain metallisation 35a as an amorphous silicon n-i-p or p-i-n diode. An n-i-p diode, that is with the n conductivity layer provided on the drain metallisation, may be preferred because of its higher quantum efficiency. A further insulating layer 36 is deposited and patterned to enable metallisation to make contact to provide an interconnection 37 to the source of the transistor and to enable the common electrode 23 to contact the cathode of the diode.

As mentioned above, the phosphor layer 11 is provided on a separate, generally aluminium, substrate 10 using deposition procedures conventional for phosphor layers. In this example the phosphor layer is a caesium iodide layer deposited by, for example, evaporation or sputtering onto the aluminium substrate 10. Of course other suitable phosphors could be used such as $Gd_2O_2S$:Tb. Although other phosphors could be used, the use of thallium-doped caesium iodide has advantages in that the spectrum of the emitted electromagnetic radiation peaks in the range 400–700 nm (nanometres) which is the most responsive range of amorphous silicon photodiodes. In addition, caesium iodide has a columnar structure which provides a sort of light-guiding effect so reducing scattering problems.

Having formed the photodiode array 21 on its substrate 20 and having separately formed the phosphor layer 11 on its substrate 10, the mounting means 40 are now used to mount the substrate 10 on the substrate 20 so as to define therebetween the insulative space 50. In this example, the mounting means 40 comprises a number of discrete insulative spacer members 41, for example short glass fibres or insulating spheres, possibly glass, which are distributed upon the surface 21a of the photodetector array 21 or upon the surface 11a of the phosphor layer 11 after having defined an adhesive pattern 42 on that surface by, for example, printing a glue line. The spacer members should be large enough so as to avoid being lost in any undulations in the thick phosphor layer but not so large as to result in a loss of resolution, for example by parallax or, by scattering electromagnetic radiation intended to reach other photodiodes (pixels) 22. In this example, the spacer members 41 will be of the order of 10 $\mu$m to 20 $\mu$m (micrometres) in diameter.

The adhesive pattern will include an adhesive border 42a around the periphery 21b or 11b of the surface. The two substrates are then brought together and the glue cured so as to provide an adhesive medium seal around the periphery 21b, 11b of the two opposed surfaces 21 and 11. The adhesive medium may be a conventional two-part epoxy of a high purity. The phosphor layer 11 carried by its substrate 10 is thus mounted to the photodetector array 21 carried by its substrate 20 and the insulative space 50 is defined.

A small gap may be left in the adhesive border 42a to enable the insulative space 50 to be evacuated and then subsequently sealed by adhesive. The provision of an evacuated insulative space 50 should provide the best possible electrical isolation between the phosphor layer 11 and the photodetector array 21. As an alternative, the insulative space 50 may be filled with an inert fluid, for example argon or nitrogen, after evacuation. The insulative space 50 could also be filled with an inert liquid having a refractive index matched to that of the phosphor layer 11 which should reduce the possibility of loss of electromagnetic radiation by reflecting or scattering. In such circumstances care should be taken that the adhesive medium does not contain any components which may contaminate the inert liquid.

In the example described above the phosphor layer 11 is provided on an aluminium substrate 10, however the use of other substrates is possible and, for example, a glass substrate coated with an evaporated aluminium layer may be used which may have advantages for large flat detectors because the thermal expansion coefficients of the two substrates 10 and 20 can then be more closely matched. As will be appreciated from the above and from FIG. 4 in particular, the phosphor layer 11 and the photodetector array 21 bound the insulative space. This means that the insulative space whether evacuated or filled with an inert medium serves at least in some respects to protect the phosphor layer 11 and the photodetector array 21 from dust particles and other contaminants which may be present in the area surrounding the detector. In addition as the incoming electromagnetic radiation passes first through the substrate 10, which in this example is at least in part formed of aluminium, the substrate 10 can serve to shield the phosphor layer 11 from undesired electromagnetic radiation (that is radiation outside the range which it is desired to detect) so that a separate light reflecting layer is not required for this purpose.

The image detector described above has particular advantages where the electromagnetic radiation conversion layer 11 is a phosphor layer such as caesium iodide which is semiconducting and thus requires extremely good electrical isolation of the photodetector array 21 from the phosphor layer. In addition the caesium iodide layer can be deposited at the temperatures required for maximum efficiency of formation of the phosphor layer even though these are currently much higher than those used for formation of the photodetector array 21 because the two manufacturing processes are completely separate.

In operation of the image detector 1, X-ray radiation A incident on the phosphor layer 11 is converted into visible (generally 400–700 nm (nanometres)) outgoing electromagnetic radiation B which then crosses the insulative space 50 to be incident on the photodetectors (pixels) 22 where a charge proportional to the intensity of the incident radiation is stored. The row lines 26 are sequentially and repetitively addressed via the row decoder/addressing circuit 28 enabling the charge stored at each photodiode 22 to be read by using the column decoder/addressing circuit 28 to scan the column lines 27.

Although in the example described above, the electromagnetic radiation conversion layer 11 is a caesium iodide phosphor layer, other phosphors or combinations of phosphors could be used. Also depending upon the particular ranges of wavelengths involved other types of electromagnetic radiation conversion layers may be used. In addition, the photodetector array 21 may be provided by any suitable form of technology and for example a polycrystalline silicon rather than an amorphous silicon thin-film technology could be used. In addition other forms of switching elements such as diodes, for example MIM structures, could be used.

The mounting means 40 may be formed in other ways, for example a custom-designed insulative, for example a glass, frame could be bonded to the peripheries 11b, 21b of the surfaces of the phosphor layer and the photodetector array 11, 21. As another possibility a silicone rubber type of material in which spacer members have been dispersed could be applied, for example by spinning or screen printing, to either the phosphor layer 11 or the photodetector array 21 and then the other of the phosphor layer 11 and the photodetector array 21 placed onto the surface of the silicone rubber layer which thus provides the mounting means and defines, with the assistance of the spacer members, the insulative space.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. An image detector comprising a first substrate having a first periphery and carrying an electromagnetic radiation conversion layer for converting incoming electromagnetic radiation with a first range of wavelengths into outgoing electromagnetic radiation with a second different range of wavelengths and a photodetector array responsive to the second range of wavelengths for detecting outgoing electromagnetic radiation emitted by the electromagnetic radiation conversion layer, characterised in that the photodetector array is carried by a second substrate having a second periphery and in that the first substrate is mounted to the second substrate by mounting means forming a seal between the first and second peripheries and spacing apart the first and second substrates so that the seal and the first and second substrates define therebetween an insulative space between the photodetector array and the electromagnetic radiation conversion layer.

2. An image detector according to claim 1, further characterized in that the seal formed by the mounting means defines the insulative space as a fluid-tight space and in that the fluid-tight space is evacuated.

3. An image detector according to claim 2, further characterized in that the mounting means comprises discrete insulative spacer members and the seal is formed by an adhesive medium.

4. An image detector according to claim 1, further characterized in that the seal formed by the mounting means defines the insulative space as a fluid-tight space and in that the fluid-tight space is filled with an inert fluid.

5. An image detector according to claim 4, further characterized in that the mounting means comprises discrete insulative spacer members and the seal is formed by an adhesive medium.

6. An image detector according to claim 1, further characterized in that the electromagnetic radiation conversion layer and the photodetector array are provided on facing surfaces of the first and second substrates to form opposed surfaces bounding the insulative space.

7. An image detector according to claim 1, further characterized in that the electromagnetic radiation conversion layer comprises an X-ray phosphor.

8. An image detector according to claim 1, further characterized in that the photodetector array comprises an array of photodiodes with associated thin-film circuitry.

9. An image detector according to claim 1, further characterized in that the mounting means comprises discrete insulative spacer members and the seal is formed by an adhesive medium.

10. A method of manufacturing an image detector, which method comprises providing on a first substrate having a first periphery an electromagnetic radiation conversion layer for converting incoming electromagnetic radiation with a first range of wavelengths into outgoing electromagnetic radiation with a second different range of wavelengths and providing a photodetector array responsive to the second range of wavelengths for detecting outgoing electromagnetic radiation emitted by the electromagnetic radiation conversion layer, characterized by providing the photodetector array on a second substrate having a second periphery and mounting the first substrate to the second substrate by forming a seal between the first and second peripheries so that the first and second substrates are spaced apart and the seal and first and second substrates define therebetween an insulative space between the photodetector array and the electromagnetic radiation conversion layer.

11. A method according to claim 10, further characterized by forming the seal so that the insulative space is a fluid-tight space and evacuating the fluid-tight space.

12. A method according to claim 11, further characterized by mounting the first substrate to the second substrate by providing discrete insulative spacer members to space apart the first and second substrates and by applying an adhesive medium to the first and second peripheries to form the seal.

13. A method according to claim 10, further characterized by forming the seal so that the insulative space is a fluid-tight space and filling the fluid-tight space with inert fluid.

14. A method according to claim 13, further characterized by mounting the first substrate to the second substrate by providing discrete insulative spacer members to space apart the first and second substrates and by applying an adhesive medium to the first and second peripheries to form the seal.

15. A method according to claim 10, further characterized by mounting the first substrate to the second substrate by providing discrete insulative spacer members to space apart the first and second substrates and by applying an adhesive medium to the first and second peripheries to form the seal.

* * * * *